（12） United States Patent
Wang (10) Patent No.: US 11,822,969 B2
(45) Date of Patent: Nov. 21, 2023

(54) RESOURCE MANAGEMENT PLATFORM-BASED TASK ALLOCATION METHOD AND SYSTEM

(71) Applicant: Guangdong Inspur Smart Computing Technology Co., Ltd., Guangzhou (CN)

(72) Inventor: Dekui Wang, Guangzhou (CN)

(73) Assignee: GUANGDONG INSPUR SMART COMPUTING TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/763,607

(22) PCT Filed: Dec. 30, 2019

(86) PCT No.: PCT/CN2019/129975
§ 371 (c)(1),
(2) Date: Mar. 24, 2022

(87) PCT Pub. No.: WO2021/056909
PCT Pub. Date: Apr. 1, 2021

(65) Prior Publication Data
US 2022/0334882 A1  Oct. 20, 2022

(30) Foreign Application Priority Data
Sep. 27, 2019 (CN) .......................... 201910925565.3

(51) Int. Cl.
*G06F 9/50* (2006.01)
*G06F 9/48* (2006.01)

(52) U.S. Cl.
CPC .......... *G06F 9/5066* (2013.01); *G06F 9/4881* (2013.01)

(58) Field of Classification Search
CPC .............................. G06F 9/4881; G06F 9/5066
See application file for complete search history.

(56) References Cited

U.S. PATENT DOCUMENTS

2018/0011867 A1* 1/2018 Bowman .............. H05K 999/99
2018/0232257 A1* 8/2018 Liu ........................ G06F 9/5016
(Continued)

FOREIGN PATENT DOCUMENTS

CN  103347055 A  10/2013
CN  107291545 A  10/2017
(Continued)

OTHER PUBLICATIONS

International Search Report dated Jun. 29, 2020 in reference to co-pending International Application No. PCT/CN2019/129975 filed Dec. 30, 2019.
(Continued)

*Primary Examiner* — Wissam Rashid
(74) *Attorney, Agent, or Firm* — Dinsmore & Shohl LLP (57) ABSTRACT

The present application discloses a task allocation method and system based on a resource management platform. The method comprises: receiving an artificial intelligence model training and/or testing task and a name of data set required for processing the task; acquiring data set distribution information of a plurality of nodes; judging if the node has the required data sets according to names of the data sets in the node; and selecting a node with the size of the required data set meeting preset requirements for task allocation according to the size of the required data set in the node if the node has the required data set. It may be seen that, in the present application, the situation of data sets in a node is taken into account during task allocation, and the node with the size of the required data set meeting preset conditions is selected for task allocation, such that the node does not need to download the required data set or reduce the frequency of downloading data sets by a node, thereby improving the efficiency in processing tasks.

7 Claims, 3 Drawing Sheets

(56) References Cited

U.S. PATENT DOCUMENTS

2018/0342042 A1    11/2018  Hu et al.
2019/0173749 A1     6/2019  Thomas
2019/0227853 A1     7/2019  Huang et al.

FOREIGN PATENT DOCUMENTS

| | | |
|---|---|---|
| CN | 107590075 A | 1/2018 |
| CN | 107885762 A | 4/2018 |
| CN | 109471727 A | 3/2019 |
| CN | 109684147 A | 4/2019 |
| CN | 109828774 A | 5/2019 |
| CN | 109936473 A | 6/2019 |
| CN | 109936606 A | 6/2019 |
| CN | 107135257 A | 9/2019 |

OTHER PUBLICATIONS

Written Opinion dated Jun. 29, 2020 in reference to co-pending International Application No. PCT/CN2019/129975 filed Dec. 30, 2019.

Chinese Office Action pertaining to Chinese Application No. 201910925565.3 filed Sep. 27, 2019.

European Search Report in reference to European Application No. 19946560 filed Dec. 30, 2019.

Ma, et al., "Custody: Towards Data-Aware Resource Sharing in Cloud-Based Big Data Processing", IEEE International Conference on Cluster Computing, Computer Society, pp. 451-460, 2016.

\* cited by examiner

RESOURCE MANAGEMENT PLATFORM-BASED TASK ALLOCATION METHOD AND SYSTEM

CROSS-REFERENCE TO RELATED APPLICATIONS

The present application is a § 371 National Stage Entry of International Application Serial No. PCT/CN2019/129975, filed Dec. 30, 2019, and claims the priority of the Chinese patent application filed with the Chinese Patent Office on Sep. 27, 2019 with the application number of 201910925565.3 and entitled "Task Allocation Method and System based on Resource Management Platform", the contents of which are incorporated herein in its entirety by reference.

TECHNICAL FIELD

The present application relates to the technical field of artificial intelligence, in particular to a task allocation method and system based on a resource management platform.

BACKGROUND ART

Along with rapid development of artificial intelligence technology and containerization technology, more and more artificial intelligence models are trained and tested on distributed resource management platforms. The existing artificial intelligence models are trained and tested using data sets, and different data sets are selected for application scenarios of different models. Accordingly, the distributed resource management platform needs to download corresponding data sets for model training and testing according to application scenarios of the models. When training tasks or testing tasks of artificial intelligence models need to be processed on a resource management platform, the resource management platform first allocates tasks to some nodes and downloads the required data sets to the nodes processing the tasks before processing the tasks.

However, the data sets required for training and testing tasks of an artificial intelligence model contain more data, and the existing resource management platform allocates tasks based on the performance of the node itself. A lot of time and resources are in need to download data sets on each node processing the tasks before the tasks are processed, thereby influencing the speed and efficiency in processing tasks.

SUMMARY OF THE INVENTION

Based on the above problems, the present application provides a task allocation method and system based on a resource management platform, capable of solving the problem of waste in time and resources caused by the requirement of downloading data sets by a large number of nodes when training or testing tasks of an artificial intelligence model are processed on a resource management platform.

Embodiments of the present application disclose the following technical solution:

In a first aspect, an embodiment of the present application provides a task allocation method based on a resource management platform, wherein the method includes:
receiving an artificial intelligence model training and/or testing task and a name of data set required for processing the task;
acquiring data set distribution information of a plurality of nodes, wherein the data set distribution information includes names of data sets in the node and size of each data set; and
judging if the node has the required data sets according to names of the data sets in the node; and selecting a node with the size of the required data set meeting preset requirements for task allocation according to the size of the required data set in the node if the node has the required data set.

Optionally, the selecting a node with the size of the required data set meeting preset requirements for task allocation according to the size of the required data set in the node includes:
obtaining a data set score of the node through a data set scoring strategy of the node according to the size of the required data set in the node, and selecting a node with the data set score meeting a preset score for task allocation.

Optionally, the data set scoring strategy of the node specifically includes:
computing a relative value $size_i$ of the size of a data set in the node according to a formula $$size_i = \frac{nodeNum}{allNum} \times datasize_i,$$

wherein i is the number of the node, nodeNum is the number of nodes with the data set in a cluster, allNum is the total number of nodes in a cluster, and $datasize_i$ is the size of a required data set in the target node;
judging the size relationship between the relative value $size_i$ of the size of the data set in the node and the minimum value minsize of the required data set and the maximum value maxsize of the required data set; enabling the relative value of the size of the data set of the node to be equal to the minimum value of the required data set if the relative value of the size of the data set of the node is less than the minimum value of the required data set; and enabling the relative value of the size of the data set of the node to be equal to the maximum value of the required data set if the relative value of the size of the data set of the node is greater than the maximum value of the required data set; and
computing the data set score $datascore_i$ of the node according to the formula $$datascore_i = \frac{size_i - minsize}{maxsize - minsize}.$$

Optionally, the method further includes: acquiring updating time of a data set of a node; the obtaining the data set score of the node includes:
judging if the required data set in the node is updated before the task is processed based on the updating time of the data set of the node; if not, using the data set score of the node computed during the last task allocation.

Optionally, the acquiring the distribution information of the data set of the node includes: obtaining distribution information of the data set of the node sent by an agent unit.

Optionally, the step that the agent unit sends the distribution information of the data set of the node includes: when the data set of the node is changed, the agent unit sends distribution information of the data set of the node.

Optionally, the selecting a node with the size of the required data set meeting preset requirements for task allocation according to the size of the required data set in the node includes:

selecting a node with its own performance and size of the required data set both meeting preset requirements for task allocation according to the performance of the node itself and the size of the required data set in the node.

Optionally, the method further includes the following step when the number of nodes with the size of the required data set meeting preset requirements may not meet the requirements for task allocation: selecting nodes with the number of required data sets not meeting preset requirements or nodes having no required data set for task allocation.

Optionally, the method further includes: checking if the node has the required data set and if the size of the required data set meets the requirement for processing tasks after tasks are allocated to each node, and downloading the required data set if the node does not have the required data set or if the number of the data sets is insufficient.

In a second aspect, an embodiment of the present application provides a task allocation system based on a resource management platform, including:

an acquisition unit, configured to receive artificial intelligence model training and/or testing tasks and names of data sets required for processing tasks, and acquire data set distribution information of a plurality of nodes, wherein the data set distribution information includes names of data sets in the node and size of each data set;

a judgment unit, configured to judge if the node has the required data sets according to names of the data sets in the node; and an allocation unit, configured to select a node with the size of the required data set meeting preset requirements for task allocation according to the size of the required data set in the node if the node has the required data set.

Optionally, the allocation unit includes:

obtaining a data set score of the node through a data set scoring strategy of the node according to the size of the required data set in the node, and selecting a node with a higher score for task allocation.

Optionally, the step that the allocation unit obtains a data set score of the node through a data set scoring strategy of the node specifically includes:

the allocation unit computes a relative value $size_i$ of the size of a data set in the node according to a formula $$size_i = \frac{nodeNum}{allNum} \times datasize_i,$$

wherein i is the number of the node, nodeNum is the number of nodes with the data set in a cluster, allNum is the total number of nodes in a cluster, and $datasize_i$ is the size of a required data set in the target node;

the allocation unit judges the size relationship between the relative value $size_i$ of the size of the data set in the node and the minimum value minsize of the required data set and the maximum value maxsize of the required data set; enables the relative value of the size of the data set of the node to be equal to the minimum value of the required data set if the relative value of the size of the data set of the node is less than the minimum value of the required data set; and enables the relative value of the size of the data set of the node to be equal to the maximum value of the required data set if the relative value of the size of the data set of the node is greater than the maximum value of the required data set; and the allocation unit computes the data set score $datascore_i$ of the node according to the formula $$datascore_i = \frac{size_i - minsize}{maxsize - minsize}.$$

Optionally, the allocation unit includes: selecting a node with its own performance and size of the required data set both meeting preset requirements for task allocation according to the performance of the node itself and the size of the required data set in the node.

Optionally, the system includes: an agent unit, configured to send distribution information of the data set of a target node to an acquisition unit when the size of the data set of the node changes.

Optionally, the system further includes: a rechecking unit, configured to check if the node has the required data set and if the size of the required data set meets the requirement for processing tasks, and download the required data set if the node does not have the required data set or if the size of the data set does not meet preset requirements.

Compared with the prior art, the present application has the following beneficial effects:

In an embodiment of the present application, a resource management platform firstly acquires the information of data set of a node before tasks are allocated, determines the node that has the required data set by comparing with the data set required for processing tasks, and selects the node with the size of the required data set meeting the preset requirement for task allocation according to the size of the required data set of the node. Therefore, it can be seen that, in the method provided in the embodiment of the present application, the situation of data sets in a node is taken into account during task allocation, and tasks are allocated to the node with the size of the required data set meeting preset requirements according to the size of the required data set of the node, such that the node does not need to download the required data set or reduce the frequency of downloading data sets by a node, thereby avoiding waste in time and resources caused when the node downloads the required data set due to no consideration of the data set of the node, and reducing network pressure of the cluster and improving the efficiency in processing tasks.

BRIEF DESCRIPTION OF THE DRAWINGS

In order to more clearly illustrate technical solutions in embodiments of the present application or in the prior art, a brief introduction will be given below on accompanying drawings which need to be used in the description of the embodiments or the prior art. Apparently, the accompanying drawings described below are merely some embodiments of the present application. Those skilled in the art can obtain other accompanying drawings according to these drawings without any creative effort.

DETAILED DESCRIPTION OF THE EMBODIMENTS

As mentioned above, in a task allocation method of a current resource management platform, the performance of each node itself is mainly considered, and statistics and analysis of the information of the data sets on the node are lacked, and the nodes are scored according to the current performance of the node itself during task allocation, so as to allocate tasks. Since the training and test of artificial intelligence models require data sets, therefore, when the training and/or testing tasks of artificial intelligence models are processed on the resource management platform, the resource management platform first allocates tasks to each node according to the current performance of each node itself, and then the node that obtains tasks downloads the data sets required for processing tasks.

However, since the data sets required for processing tasks often contain a large amount of data, these data sets are large, each nodes takes longer time during downloading, and needs more network resources, moreover, task processing may be initiated after the data set is downloaded, therefore, downloading of the required data set on the node will lead to a waste in time and resources, thereby reducing the efficiency in processing tasks.

Through researches, the inventor found that a lack of analysis of the data sets on the nodes in the task allocation method of the prior art leads to the above problems in task processing by the node, therefore, in the existing task allocation method of the resource management platform, the situation of the data set of the node needs to be taken into account. The information of data sets on each node needs to be acquired, wherein the information must include names of data sets of the node, to determine if the node has the required data set. Since the size of the data set required for each task processing varies, some tasks only require part of the data sets, while some tasks require larger data sets, therefore, the size of required data set of each node needs to be obtained, the node with the size of the required data set meeting preset requirements is selected during task allocation, to reduce downloading of the data set by the node. Therefore, through acquisition and analysis of information of data sets of the node, the tasks are allocated to a node with the required data set, thereby avoiding downloading of the required data sets by the node or reducing downloading of the required data sets, reducing the pressure on the network resource, and improving efficiency in processing tasks.

In order to enable those skilled in the art to better understand solutions of the present invention, the technical solutions in the embodiments of the present invention will be clearly and completely described below in combination with the accompanying drawings in the embodiments of the present invention, apparently, the described embodiments are merely a part but not all of the embodiments of the present invention. Based on the embodiments in the present invention, all the other embodiments obtained by those skilled in the art without any creative effort shall all fall within the protection scope of the present invention.

First Embodiment

Figure 1:
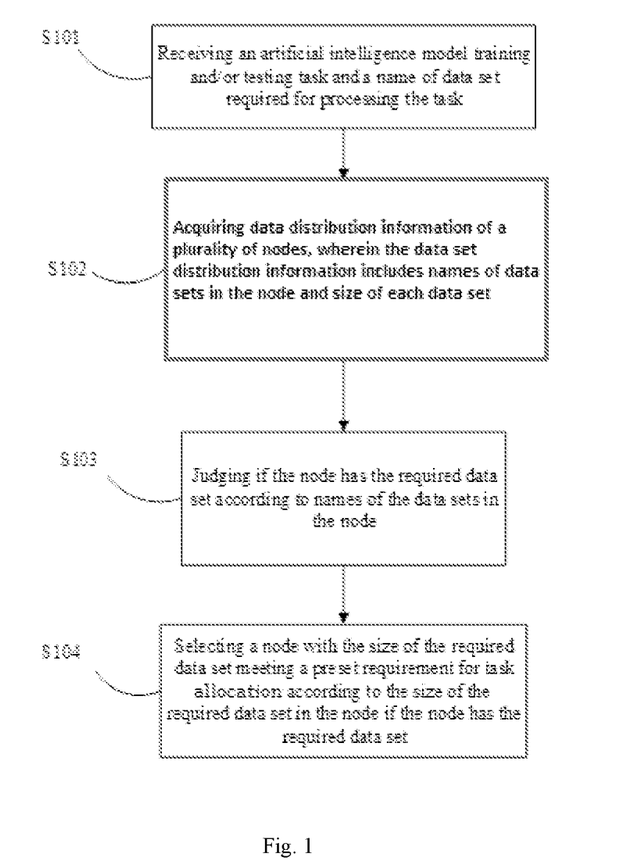
FIG. 1 is a flow diagram of a task allocation method based on a resource management platform provided in an embodiment of the present application.

Please refer to FIG. 1 which is a flow diagram of a task allocation method based on a resource management platform provided in an embodiment of the present application.

It should be noted that, the method provided in an embodiment of the present application may be applied to a distributed resource management platform, such as kubernetes and other resource management platforms.

In the present embodiment, the method may be implemented through the following steps S101 to S104.

S101: receiving an artificial intelligence model training and/or testing task and a name of data set required for processing the task.

It should be noted that, the type of artificial intelligence models is not defined in the embodiment of the present application. The artificial intelligence models mentioned in the embodiment of the present application may be algorithmic models in deep learning or machine learning.

It should be noted that, the task in the embodiment of the present application may be a training task or a testing task of the model, and the type of tasks to be processed is not defined herein.

It should be noted that, the data set mentioned in the embodiment of the present application may be a classical data set commonly used by those skilled in the art for training artificial intelligence models, and the specific selection of data sets may be determined according to the requirements of actual artificial intelligence models. For example, the data set may be an MNIST data set; alternatively, the data set may be an ImageNet data set.

It should be noted that, the specific manner of acquiring tasks and names of data sets by a resource management platform is not defined in an embodiment of the present application, and may be submitted by technicians to a resource management platform in a possible implementation manner.

S102: acquiring data set distribution information of a plurality of nodes, wherein the distribution information of the data set includes names of data sets of the node and size of each data set.

It should be noted that, a plurality of nodes mentioned in the embodiment of the present application may be all the nodes in a resource management platform.

It should be noted that, the representation manner of the size of a data set in the distribution information of the data set is not defined in an embodiment of the present application, in a possible implementation manner, it may be specific numerical representation with the size of a data set. In another possible implementation manner, it may be a percentage accounted for the size of the data set in the total size of the data set.

It should be noted that, specific manner of acquiring distribution information of the data set is not defined in an embodiment of the present application, in a possible implementation manner, cached distribution information of the data set of the node is acquired from the unit in which related information is stored.

S103: judging if the node has the required data sets according to names of the data sets in the node.

It should be noted that, the specific way of comparison is not defined in an embodiment of the present application; in one possible implementation manner, the node has the required data set is judged through directly comparing the name of the data set required for processing tasks with the name of the data set in the node; in another possible implementation manner, the number corresponding to each data set is firstly preset, and whether the node has the required data set is judged through comparing the numbers.

S104: selecting a node with the size of the required data set meeting preset requirements for task allocation according to the size of the required data set in the node if the node has the required data set.

It should be noted that, preset requirement of the size of the required data set is not defined in the embodiment of the present application, and may be set according to actual conditions of task processing, wherein the preset requirement of the size of the data set may be different from the size of the data set required for task processing.

It should be noted that, as to task allocation to the node mentioned in the embodiment of the present application, allocation of different numbers of tasks may be performed according to actual conditions to each node to be allocated with tasks according to specific situation of each node and the situation that the node in the cluster has data sets.

In the present embodiment, artificial intelligence model training and/or testing tasks and names of data sets required for processing tasks are firstly received, and data set distribution information of nodes is required; secondly, the name of the required data set is compared with the name of the data set in the node; and finally, the node with the size of the required data set meeting preset requirements is selected for task allocation according to the size of the required data set in the node with the required data set. It may be seen that, by acquiring the information of the data set in the node, the node with the required data set is determined, and the tasks are allocated to the node with the size of the required data set meeting preset requirements, such that the tasks are allocated to the node with the data sets, thereby reducing the frequency of downloading data sets by a node allocated with tasks or reducing the size of the data set downloaded by a node, relieving network pressure caused by a large number of data sets downloaded by a resource management platform, reducing the time in downloading data sets by a node, and improving the efficiency of processing tasks on the resource management platform.

Second Embodiment

In the above first embodiment, a node with the size of required data set meeting preset requirements is selected for task allocation, and the size of the required data set of the node is difficult to be quantized. Moreover, during actual task allocation, when a cluster has a small number of nodes with the size of the required data set meeting preset requirements, according to the above allocation method, a large number of tasks will be easily allocated to a small number of nodes, thereby resulting in an excessive load on each node allocated with tasks.

Figure 2:
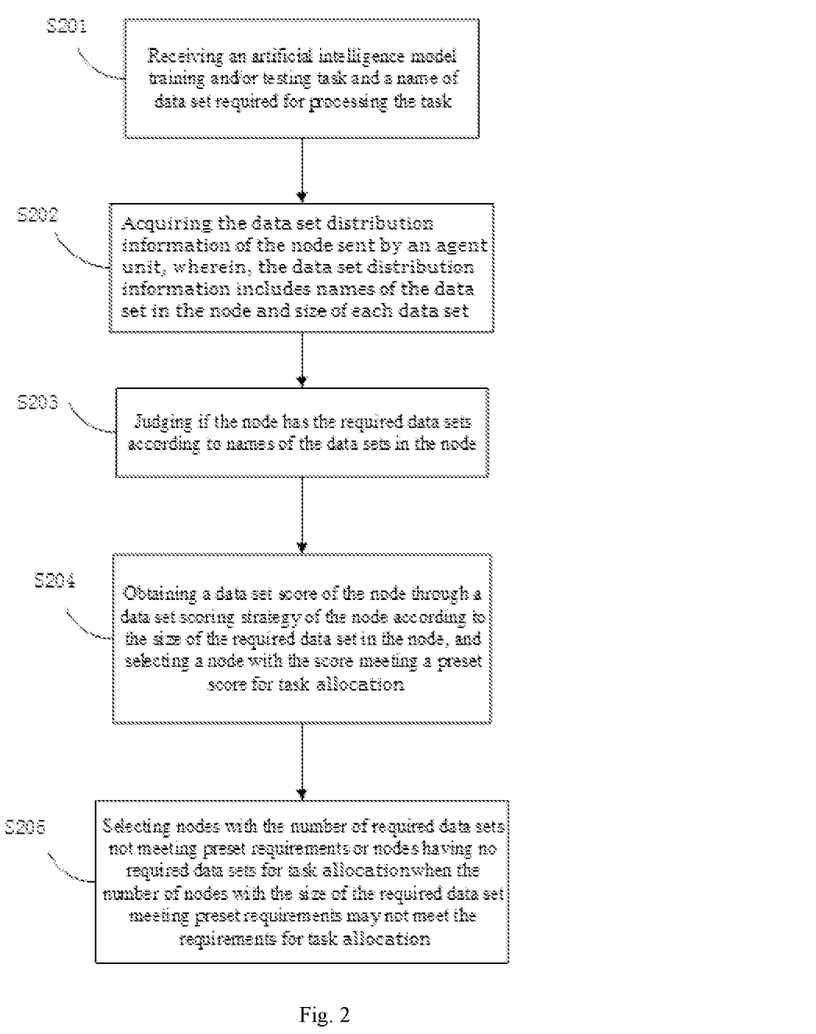
FIG. 2 is a flow diagram of another task allocation method based on a resource management platform provided in an embodiment of the present application.

Aiming at the above condition, the present application provides another task allocation method based on a resource management platform, and FIG. 2 is a flow diagram of another task allocation method based on a resource management platform provided in an embodiment of the present application.

The embodiment is described in details below.

S201: receiving an artificial intelligence model training and/or testing task and a name of data set required for processing the task.

S202: acquiring distribution information of the data set of the node sent by an agent unit, wherein the distribution information of the data set includes names of the data set in the node and the size of each data set.

It should be noted that, the agent units in the embodiment of the present application may be deployed on each node in a cluster, and are in one-to-one correspondence with the nodes.

It should be noted that, the data set distribution information in an embodiment of the present application may further include updating time of each data set and other information.

It should be noted that, the trigger time at which the agent unit sends data set distribution information of a node is not defined in an embodiment of the present application. In a possible implementation manner, when the agent unit detects a change in the data set on the node, such as under such conditions of newly adding a data set, deleting a data set and updating a data set, the new distribution information of a data set is sent.

S203: judging if the node has the required data sets according to names of the data sets in the node.

S204: obtaining a data set score of the node through a data set scoring strategy of the node according to the size of the required data set in the node, and selecting a node with the score meeting a preset score for task allocation.

It should be noted that, the specific data set scoring strategy of a node is not defined in the embodiment of the present application, and the data set scoring strategy may be developed according to the actual situation of nodes and task allocation in a resource management platform. In one possible implementation manner, the ratio of the size of the required data set in the node and the size of the data set required for processing tasks is computed and taken as a data set score of a node, and the node with the size of the required data set meeting preset requirements is determined according to the ratio of relative sizes of the data sets of each node.

S205: selecting nodes with the number of required data sets not meeting preset requirements or nodes having no required data sets for task allocation when the number of nodes with the size of the required data set meeting preset requirements may not meet the requirements for task allocation.

It should be noted that, the number of nodes required for a specific processing task is not defined in an embodiment of the present application, and the specific number may be set according to the processed task and the performance of each node.

It should be noted that, the selection strategy for nodes with the size of data sets not meeting the requirements or nodes which do not have data sets is not defined in the embodiment of the present application, and those skilled in the art may preset according to the performance of the node on the resource management platform and requirements for processing tasks.

In the present embodiment, the size of the required data set in the node may be accurately quantized through setting the data set scoring strategy of the nodes, thereby facilitating selection of the nodes; moreover, when the number of nodes with the size of the required data set meeting preset requirements is insufficient, the tasks are allocated to nodes with fewer data sets or nodes which have no data set, thereby avoiding excessive load of a single node caused by allocation of a large number of tasks to fewer nodes when the nodes with the required data sets are fewer, which may influence task processing.

Third Embodiment

In the above two exemplary embodiments, required data sets on the node are considered for task allocation on nodes. During task allocation, a larger node with required data sets is selected for task allocation, thereby ensuring to reduce downloading of data sets during task processing. However, in some conditions, larger nodes with required data sets may not meet requirements for processing tasks in terms of their own performances, nodes with the highest efficiency in processing tasks may not be selected under current conditions by only considering if nodes have data sets. Aiming at such a condition, the present application provides another embodiment of a task allocation method based on a resource management platform.

The present embodiment differs from the previous two embodiments as follows: for the selection of the node to be allocated with tasks, not only the required data set of the node is considered, but also the computing and storage capabilities of the node itself are taken into account.

In the present embodiment, anode with its own performance and the size of the required data set meeting preset requirements is selected for task allocation according to the performance of the node itself and the size of the required data set in the node.

It should be noted that, in an embodiment of the present application, the performance of the node itself and the size of the required data set in the node are not specifically defined, and the specific data of the performance of the node itself is also not defined, which may be set according to actual conditions of processed data.

It should be noted that, in an embodiment of the present application, the judgment of each performance in the node is not defined, in a possible implementation manner, the judgment may be realized through a well-set scoring strategy of performance of a node, and the total evaluating score of the node is obtained through computing a weighted value of scores with different performances of a node. It may be understood that, in another implementation manner, the evaluating score of the overall performance of the node may be further obtained in combination with a scoring strategy of the resource management platform itself and in combination with the data set score of the node.

In an embodiment of the present application, the performance of the node itself is further considered on the basis of originally considering the data set information of the node, the performance of the node is added to the consideration of the node, thereby ensuring that the selected node meets requirements for processing tasks in both its own performance and data set, and improving efficiency in processing tasks of the resource management platform.

Fourth Embodiment

A task allocation method based on a resource management platform provided in an embodiment of the present application is introduced below, and the method provided in an embedment of the present application is introduced below in combination with specific scenarios.

In the scenario, the resource management platform is Kubernetes, and algorithm technicians submit a training task of an artificial intelligence model to a Kubernetes resource management platform, and specify the name of the data set as dataset. An agent unit is set on each node in advance, and when the data set information of a node changes, the distribution information of a data set of each node is submitted to a resource management platform Kubernetes. Wherein the distribution information of a data set submitted by an agent unit includes the name $dataset_i$ of the data set and the size $datasize_i$ of each data set in the node, the size of each data set corresponds to the name of the data set and i represents the number of a node. The task allocation unit in Kubernetes judges if each node has the required data set according to the name of the data set in the node and the name of the data set required for processing tasks. The size of the required data sets in the nodes having the required data set is compared, and the node with the size of the required data set meeting preset requirement is selected for task allocation. Wherein, to facilitate selection of nodes, the node is scored according to a preset data set scoring strategy of the node. Since the Kubernetes resource management platform has a scoring strategy for the performance of the node, therefore, the node is allocated with tasks based on the original node scoring strategy of the Kubernetes platform and in combination with the data set scores of the node. According to the formula $$size_i = \frac{nodeNum}{allNum} \times datasize_i,$$

the relative value $size_i$ of the size of the data set in the node is computed; wherein nodeNum is the number of nodes with the data set in a cluster and allNum is the total number of nodes in a cluster. In order to prevent the obtained score of the nodes from being negative, the size relationship between the relative value $size_i$ of the size of the data set of the node and the minimum value minsize of the required data set and the maximum value maxsize of the required data set is judged. Wherein, the maximum and minimum values of the required data set are set by the algorithm technicians at the time of task submission according to the actual situation of the processed task. If the relative value of the size of the data set of the node is less than the minimum value of the required data set, then the relative value of the size of the data set of the node is enabled to be equal to the minimum value of the required data set; if the relative value of the size of the data set of the node is greater than the maximum value of the required data set, then the relative value of the size of the data set of the node is enabled to be equal to the maximum value of the required data set. Since Kubernetes has the original node scheduling strategy, the score datascore of the data set of the node is obtained according to the formula $$datascore_i = \frac{size_i - minsize}{maxsize - minsize} \times weight.$$

Wherein weight is a weighted value of the score of the data set in the scheduling strategy of Kubernetes, and weight can take a value of 10. The obtained score of the data set of the node is added to the score of the original node of Kubernetes, for the node having no required data set, the score of the data set is 0, and a node with the score capable of meeting requirements for processing tasks is selected for task allocation. When the number of nodes meeting requirements is less, a node with the score not meeting requirements is selected. Moreover, after task allocation is completed, the size of required data set in each node is checked, and for the node having no required data set or the number of data sets being insufficient, the required data set is downloaded.

Fifth Embodiment

Figure 3:
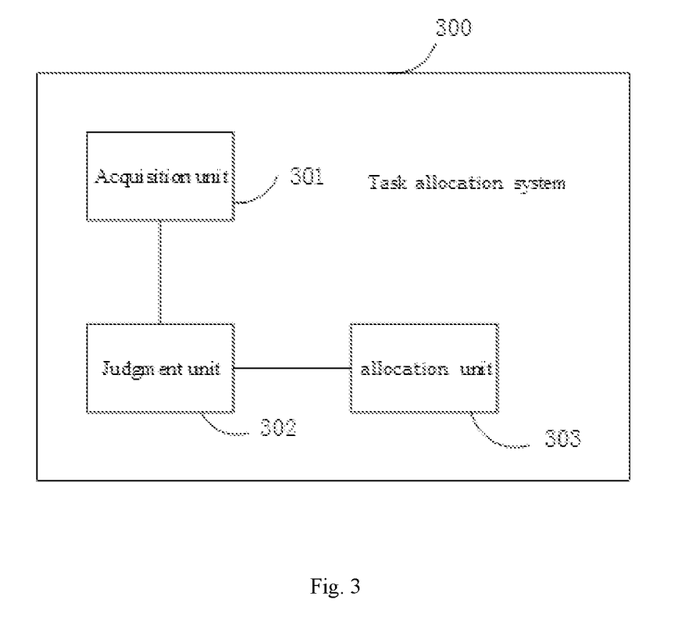
FIG. 3 is a structural schematic diagram of a task allocation system based on a resource management platform provided in an embodiment of the present application.

Please refer to FIG. 3 which is a structural schematic diagram of a task allocation system based on a resource management platform provided in an embodiment of the present application.

The system 300 for example may specifically include: an acquisition unit 301, a judgment unit 302 and an allocation unit 303.

The acquisition unit 301 may be configured to receive artificial intelligence model training and/or testing tasks and names of data sets required for processing tasks, and acquire data set distribution information of nodes, wherein the data set distribution information includes names of data sets in the node and size of each data set;

a judgment unit 302 may be configured to judge if the node has the required data sets according to names of the data sets in the node; and an allocation unit 303 may be configured to select a node with the size of the required data set meeting preset requirements for task allocation according to the size of the required data set in the node if the node has the required data set.

In some possible execution modes, the allocation unit may be configured to obtain a data set score of the node through a data set scoring strategy of the node according to the size of the required data set in the node, and select a node with a higher score for task allocation.

In some possible execution modes, the allocation unit is configured to select a node with its own performance and size of the required data set both meeting preset requirements for task allocation according to the performance of the node itself and the size of the required data set in the node.

The system may further include: an agent unit configured to send distribution information of the data set of a target node to an acquisition unit when the size of the data set of the node changes.

In some possible execution modes, the system may also include a rechecking unit, configured to check if the node has the required data set and if the size of the required data set meets preset requirements, and download the required data set if the node does not have the required data set or if the size of the data sets does not meet preset requirements.

Since the system 300 is a system corresponding to the method provided in the above method embodiment, therefore, as to the description of each unit of the system 300, please refer to the described part of the above method embodiment, which will not be repeated redundantly herein.

In the present embodiment, the acquisition unit receives tasks and names of required data sets and data set distribution information of each node. The judgment unit determines nodes with the required data sets according to names of the required data sets and data set distribution information of the node, and performs task allocation on the node with the size of the required data set meeting preset requirements. The situation of data sets of a node is considered during task allocation, tasks are allocated to nodes with required data sets, thereby reducing downloading of the data sets required by task processing by the node, relieving network pressure of the cluster of a resource management platform, saving time spent in downloading data sets by a node, and improving efficiency in processing tasks of an artificial intelligence model requiring data sets by a distributed resource management platform.

It should be understood that, in the present application, "at least one (item)" means one or more, and "a plurality of" means two or more. The term "and/or" is used to describe an association relationship of associated objects, indicating that three relationships may exist, for example, "A and/or B" may indicate: only A exists, only B exists and both A and B exist, wherein A and B can be singular or plural. The character "/" generally indicates an "or" relationship between the associated objects. The phrase "at least one of the following" or its equivalents refers to any combination of these items, including any combination of singular (one) or plural (one) items. For example, at least one item(one) of a, b, or c can be represented as: a, b, c, "a and b", "a and c", "b and c", or "a and b and c", wherein a, b, and c can be singular or plural.

It should be noted that, each embodiment in the present specification is described in a progressive manner, and the same and similar parts between each embodiment can be referred to each other, and each embodiment focuses on the differences from other embodiments. In particular, for the device and system embodiments, since they are basically similar to the method embodiment, therefore, the description is relatively simple, and for the relevant part, please refer to part of the description of the method embodiment. The device and system embodiments described above are merely exemplary, wherein the units illustrated as separate components may be or may not be physically separated, and the components illustrated as units may be or may not be physical units, i.e., they may be located in one place or may be distributed to a plurality of network units. Some or all of these modules may be selected according to actual requirements to achieve the purpose of the solution of the present embodiment. It may be understood and implemented by those skilled in the art without any creative effort.

The above mentioned is merely a specific execution mode of the present application, but the protection scope of the present application is not limited hereto, and any changes or substitutions that can be readily thought of by those skilled in the art within the technical scope disclosed by the present application shall fall within the protection scope of the present application. Therefore, the protection scope of the present application should be subject to the protection scope of the claims.

The invention claimed is:

1. A task allocation method based on a resource management platform, comprising:

receiving an artificial intelligence model training and/or testing task and a name of data set required for processing the task;

acquiring data set distribution information of a plurality of nodes, wherein:

the acquiring includes obtaining distribution information of the data set of the node sent by an agent unit, the sending of the distribution information of the data set of the node by the agent unit comprises: when the data set of the node is changed, the agent unit sends distribution information of the data set of the node, and the data set distribution information comprises names of data sets in each node of the plurality of nodes and size of each data set; and judging if each node of the plurality of nodes has the required data set according to names of the data sets in the node; and selecting a node with the size of the required data set meeting a preset requirement for task allocation according to the size of the required data set in the node if the node has the required data set.

2. The method according to claim 1, wherein, the selecting a node with the size of the required data set meeting a preset requirement for task allocation according to the size of the required data set in the node comprises:

obtaining a data set score of the node through a data set scoring strategy of the node according to the size of the required data set in the node, and selecting a node with the data set score meeting a preset score for task allocation.

3. The method according to claim 2, wherein, the data set scoring strategy of the node specifically comprises:
  computing a relative value size, of the size of a data set in the node according to a formula $size_i = nodeNum/allNum \times datasize_i$, wherein i is the number of the node, nodeNum is the number of nodes with the data set in a cluster, allNum is the total number of nodes in the cluster, and $datasize_i$ is the size of a required data set in the target node;
  judging the size relationship between the relative value $size_i$ of the size of the data set in the node and a minimum value minsize of the required data set and a maximum value maxsize of the required data set; enabling the relative value $size_i$ of the size of the data set of the node to be equal to the minimum value of the required data set if the relative value $size_i$ of the size of the data set of the node is less than the minimum value of the required data set; and enabling the relative value $size_i$ of the size of the data set of the node to be equal to the maximum value of the required data set if the relative value $size_i$ of the size of the data set of the node is greater than the maximum value of the required data set; and
  computing the data set score $datascore_i$ of the node according to the formula $$datascore_i = \frac{size_i - minsize}{maxsize - minsize}.$$

4. The method according to claim 2, wherein, the method further comprises: acquiring updating time of a data set of a node;
  the obtaining the data set score of the node comprises:
  judging if the required data set in the node is updated before the task is processed based on the updating time of the data set of the node; if not, using the data set score of the node computed during a last task allocation.

5. The method according to claim 1, wherein, the selecting a node with the size of the required data set meeting a preset requirement for task allocation according to the size of the required data set in the node comprises:
  selecting a node with its own performance and size of the required data set both meeting preset requirements for task allocation according to the own performance of the node and the size of the required data set in the node.

6. The method according to claim 1, further comprising the following step when the number of nodes with the size of the required data set meeting preset requirements may not meet the requirement of task allocation:
  selecting nodes with the number of required data set not meeting preset requirements or nodes having no required data sets for task allocation.

7. The method according to claim 1, further comprising checking if the node has the required data set and if the size of the required data set meets the requirement for processing tasks after tasks are allocated to each node, and downloading the required data set if the node does not have the required data set or if the number of the data sets is insufficient.

* * * * *